(12) United States Patent
Jung et al.

(10) Patent No.: US 6,900,558 B1
(45) Date of Patent: May 31, 2005

(54) RECIPROCATING MOTOR

(75) Inventors: Won-Hyun Jung, Changwon (KR); Bon-Cheol Ku, Kimhae (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 10/478,123

(22) PCT Filed: May 22, 2002

(86) PCT No.: PCT/KR02/00974
§ 371 (c)(1),
(2), (4) Date: Nov. 20, 2003

(87) PCT Pub. No.: WO02/095907
PCT Pub. Date: Nov. 28, 2002

(30) Foreign Application Priority Data

May 22, 2001 (KR) .................................. 2001-28034

(51) Int. Cl.$^7$ ............................ H02K 5/00; H02K 33/00
(52) U.S. Cl. ........................................ 310/17; 310/15
(58) Field of Search .............................. 310/12, 15, 17

(56) References Cited

U.S. PATENT DOCUMENTS

| | | | | |
|---|---|---|---|---|
| 5,598,071 A | * | 1/1997 | Dunfield et al. | 318/254 |
| 6,097,125 A | * | 8/2000 | Park et al. | 310/156.45 |
| 6,417,604 B1 | * | 7/2002 | Hartmann et al. | 313/155 |
| 6,606,019 B1 | * | 8/2003 | Ohashi | 335/302 |
| 2001/0051317 A1 | * | 12/2001 | Nakano | |

FOREIGN PATENT DOCUMENTS

| | | | | |
|---|---|---|---|---|
| JP | 58046856 | | 3/1983 | |
| JP | 358046856 A | * | 3/1983 | .......... H02K/21/08 |
| JP | 401283049 A | * | 11/1989 | .......... H02K/47/14 |
| JP | 06296336 | | 10/1994 | |
| JP | 2000 253640 | | 9/2000 | |

OTHER PUBLICATIONS

Translation of Japanese reference 1989–283049, Kikuchi et al., Pulse Motor, Nov. 1989.*

Internatinal Preliminary Examination Report dated Dec. 2, 2004 issued by Patent Cooperation Treaty in connection with corresponding International Application No. PCT/KR02/00974.

* cited by examiner

Primary Examiner—Darren Schuberg
Assistant Examiner—Judson H. Jones
(74) Attorney, Agent, or Firm—Ostrolenk, Faber, Gerb & Soffen, LLP

(57) ABSTRACT

A reciprocating motor in which a plurality of eddy current preventing holes (26) are formed in the directions of circumference and shaft of a magnet frame (10) in a magnet mounting portion (12) of the magnet frame (10)connected between the magnet (8)and component part which will perform a reciprocating movement, for transmitting a reciprocating movement of the magnet (8) to a component part, to prevent deformation of the magnet frame (10)in molding the eddy current (26) and maintain roundness of the magnet frame precisely by improving the structure of the eddy current preventing holes which are molded in the magnet frame.

11 Claims, 6 Drawing Sheets

RECIPROCATING MOTOR

TECHNICAL FIELD

The present invention relates to a reciprocating motor and particularly, to a reciprocating motor, capable of minimizing eddy current loss which is generated in driving a motor and lengthening life span of the motor.

BACKGROUND ART

In general, a motor is divided to a rotary motor for changing electric energy into rotary movement, reciprocating motor which changes electric energy into linear reciprocating movement, and the like.

Particularly, in the reciprocating motor an outer stator and inner stator are positioned a predetermined interval apart from each other and a rotor having a magnet between the outer and inner stators. When a power is applied to a coil which is wound on the stator, the rotor preforms a linear reciprocating movement by interaction between the stator and magnet. The reciprocating motor is commonly used for a reciprocating compressor.

Figure 1:
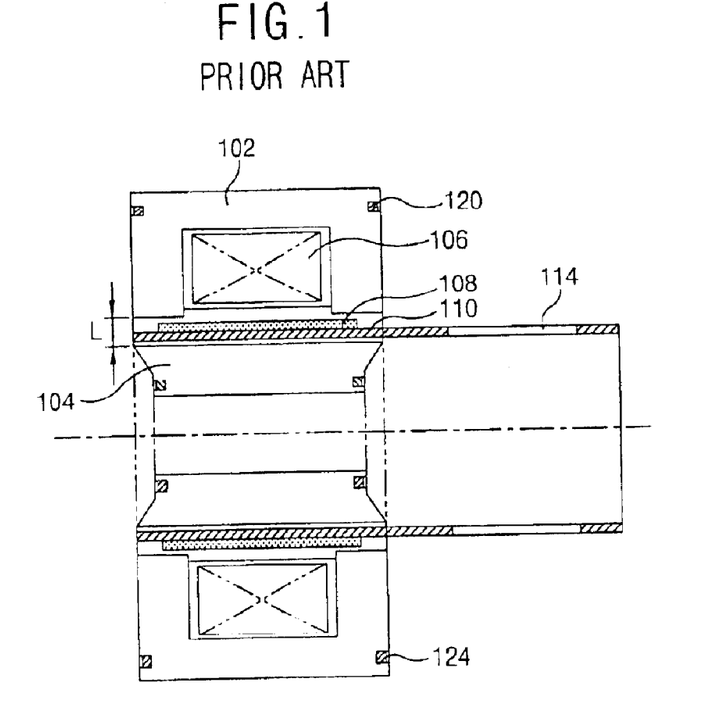
FIG. 1 is a cross-sectional view showing a conventional reciprocating motor.

FIG. 1 is a cross-sectional view showing a conventional reciprocating motor.

The conventional reciprocating motor includes a cylindrical outer stator 102 which is fixed to a housing (not shown), an inner stator 104 positioned having a predetermined air gap on the inner circumferential surface of the outer stator 102, for forming a flux between itself and the outer stator 102, a coil 106 which is wound in the inner portion of the outer stator 102, a magnet 108 which is positioned between the outer stator 102 and inner stator 104, capable of performing a linear movement, a magnet frame 110 connected between the magnet 108 and a component part (not shown) ch will perform reciprocating movement, for transmitting the reciprocating movement of the magnet 108 to the component part.

The outer stator 102 is formed in a cylindrical shape by layering a plurality of ironic cores and a coil 106 is wound in the inner side of the outer stator 102. The inner stator 104 is formed in a cylindrical shape by layering a plurality of ironic cores having a predetermined gap L on an inner circumferential surface of the outer stator 102. The coil 106 forms a flux between the outer stator 102 and inner stator 104 when a power is applied from the outside and fixed rings 120 and 124 for fixing layered iron cores are respectively mounted in the outer stator 102 and inner stator 104.

Figure 2:
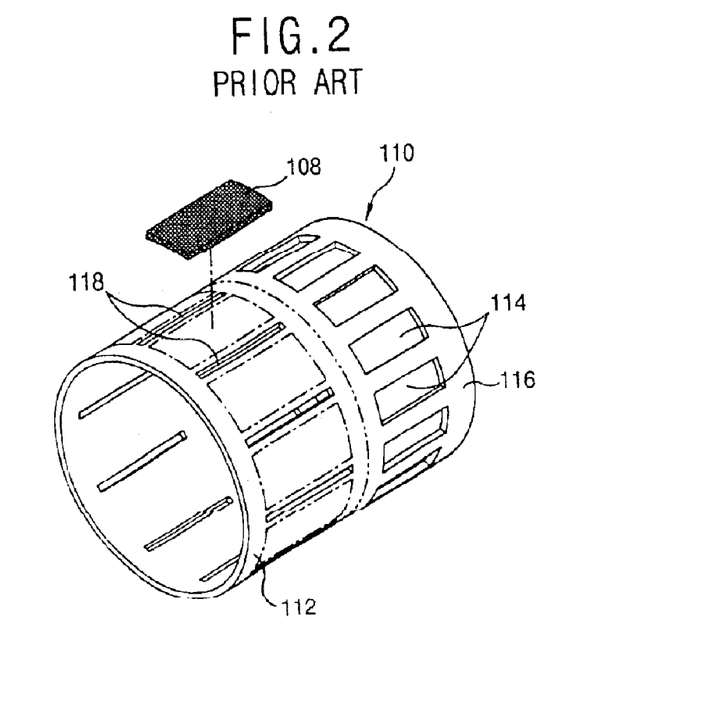
FIG. 2 is a perspective view showing a magnet frame of a conventional reciprocating motor.

As shown in FIG. 2, the magnet frame 110 is formed in a cylindrical shape between the outer stator 102 and inner stator 104 capable of performing a reciprocating movement and the thickness of the magnet frame 110 must be formed as thin as possible to minimize the air gap L between the outer stator 102 and inner stator 104. Accordingly, conventionally, the magnet frame 110 is manufactured by molding methods such as sheet metal forming, compression or die casting of non-magnetic metal material.

As shown in FIG. 2, the magnet frame 110 includes a magnet mounting portion 112 in which the magnet 108 is mounted at a uniform interval in the direction circumference of a side portion positioned between the outer stator 102 and inner stator 104, and a connecting portion 116 in which a plurality of air passes 114 are formed in the circumferential direction at the other side of the magnet frame 110, and which transmits a reciprocating moving force to an operating unit (not shown) which will perform a linear reciprocating movement.

In the magnet mounting portion 112, magnets 108 having a predetermined width and length are fixed at a predetermined interval in the circumferential direction and a slit 118 for preventing eddy current loss by the magnet 108 is formed in the magnet mounting portion 112.

The slit 118 intercepts loss of the current which flows in the circumferential direction of the magnet frame 110 when the magnet 108 performs a linear reciprocating movement and prevents lowering of motor efficiency according to eddy current loss. The slit 118 is formed protruded in the shape of stripe having a narrow width in the stroke direction of the magnet 108.

The operation of the conventional reciprocating motor with the above composition will be described as follows.

When the power is applied to the coil 110, a flux is formed around the coil 110 and the flux forms a closed loop along the outer stator 106 and inner stator 108. The magnet 112 linearly moves in the direction of shaft by the interaction between the flux generated between the outer stator 106 and inner stator 108 and the flux generated by the magnet 112. In addition, ff the direction of the current applied to the coil 110 is changed in turn, the magnet 112 performs a linear reciprocating movement changing the flux direction of the coil 110. Then, the magnet frame 114 in which the magnet 112 is fixed, performs a linear reciprocating movement so that the operating unit such as a piston and the like performs a linear reciprocating movement.

Here, an eddy current is generated in the circumferential direction of the magnet frame 110 by the linear reciprocating movement of the magnet 108 and the eddy current loss is attenuated by the slit 118 which is formed in the magnet mounting portion 112.

However, in the conventional reciprocating motor, the slit formed to attenuate eddy current loss generated in driving the motor, is formed in the shape of a stripe having a narrow width and accordingly, there occurs a problem that molding accuracy is lowered since the slit is deformed by the compressing stress generated in the circumferential direction of the magnet frame in the molding operation, and it is difficult to maintain roundness of the magnet frame.

Also, when the magnet performs a linear reciprocating movement, a force is applied to the magnet frame in the direction of the length by inertia of the magnet and an edge crack is generated in an edge portion of the slit by the force applied to the magnet frame.

Also, when a slit is processed in the magnetic frame, the slit is formed by the punching operation using a punch or die. Since the width of the slit is narrow and thin, and the width of the punch for the punching operation is also narrow and the thickness of the punch is thin, there occurs a problem that the punch and die are damaged in the processing.

DISCLOSURE OF THE INVENTION

Therefore, it is an object of the present invention to provide a reciprocating motor, capable of minimizing eddy current loss which is generated in a magnet frame, in driving a motor.

A second object of the present invention is to provide a reciprocating motor, capable of preventing deformation of the magnet frame in shaping an eddy current preventing hole by improving the structure of the eddy current preventing hole which is formed in the magnetic frame, to attenuate the eddy current loss and maintaining roundness of the magnetic frame.

A third object of the present invention is to provide a reciprocating motor formed in a structure that the eddy current preventing hole, which is formed in the magnetic frame can strengthen the magnetic frame, capable of preventing damage of the magnetic frame caused from a load applied to the magnetic frame by the reciprocating movement of the magnet in driving the motor.

A fourth object of the present invention is to provide a reciprocating motor, capable of preventing damage of shaping instrument and reduce manufacturing cost, by improving a method for forming the eddy current preventing hole in the magnetic frame.

To achieve these objects, there is provided a reciprocating motor, including an outer stator, an inner stator which is positioned having a predetermined air gap on an inner circumferential surface of the outer stator, a coil which is wound on either the outer stator or inner stator, a magnet which is positioned capable of performing linear movement between the outer stator and inner stator, and a magnet frame connected between the magnet and operating portion which will perform a reciprocating movement, for transmitting the reciprocating movement of the magnet to the component parts. A plurality of eddy current protection holes are formed in the directions of circumference and shaft in the magnet mounting portion.

The eddy current protection hole is processed by the punching operation.

The eddy current protection hole is a circular through hole having a predetermined diameter.

The eddy current protection hole is a through hole formed in a polygonal shape.

The eddy current protection hole is a through hole formed in an oval shape.

The eddy current protection hole is a cross-shaped through hole.

MODES FOR CARRYING OUT THE PREFERRED EMBODIMENTS

Hereinafter, an embodiment of a reciprocating motor in accordance with the present invention will be described with reference to the accompanied drawings.

A plurality of embodiments of the reciprocating motor in accordance with the present invention can exist and hereinafter, preferred embodiments will be described as follows.

Figure 3:
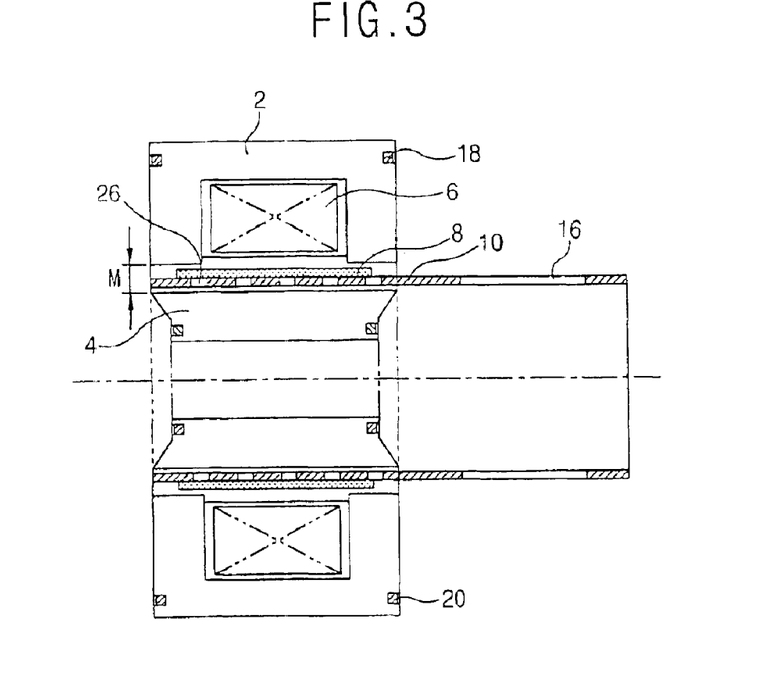
FIG. 3 is a cross-sectional view showing a reciprocating motor in accordance with the present invention.

FIG. 3 is a cross-sectional view showing the reciprocating motor in accordance with the present invention.

The reciprocating motor in accordance with the present invention includes a cylindrical outer stator 2 which is fixed to a housing (not shown), an inner stator 4 which is positioned having a predetermined air gap M on an inner circumferential surface of the outer stator 2 and forms a flux between itself and the outer stator 2, a coil 6 which is wound on either the outer stator 2 or inner stator 4, a magnet 8 which is positioned capable of performing linear movement between the outer stator 2 and inner stator 4, and a magnet frame 10 connected between the magnet 8 and the operating unit (not shown) which will perform a reciprocating movement, for transmitting the reciprocating movement of the magnet 8 to the operating unit.

Here, as an example of the operating unit, in case the reciprocating motor is applied to the reciprocating compressor, a piston which performs a linear reciprocating movement can be the operation unit.

The outer stator 2 is formed in a cylindrical shape by layering many sheets of ironic core and the inner stator 4 is positioned having a predetermined gap M inside the outer stator 2 and is formed in a cylindrical shape that a plurality of sheets of ironic core are layered. The coil 6 is wound on a portion either on the inner circumferential surface of the outer stator 2 or on the outer circumferential surface of the inner stator 4 and when a power is supplied, a flux is formed between the outer stator 2 and inner stator 4. Fixed rings 18 and 20 for fixing the layered ironic core is mounted at both sides of the outer stator and inner stator.

The magnet 8 is fixed to the magnet frame 10 in the form that is divided into many parts in the circumferential direction between the outer stator 2 and inner stator 4.

Figure 4:
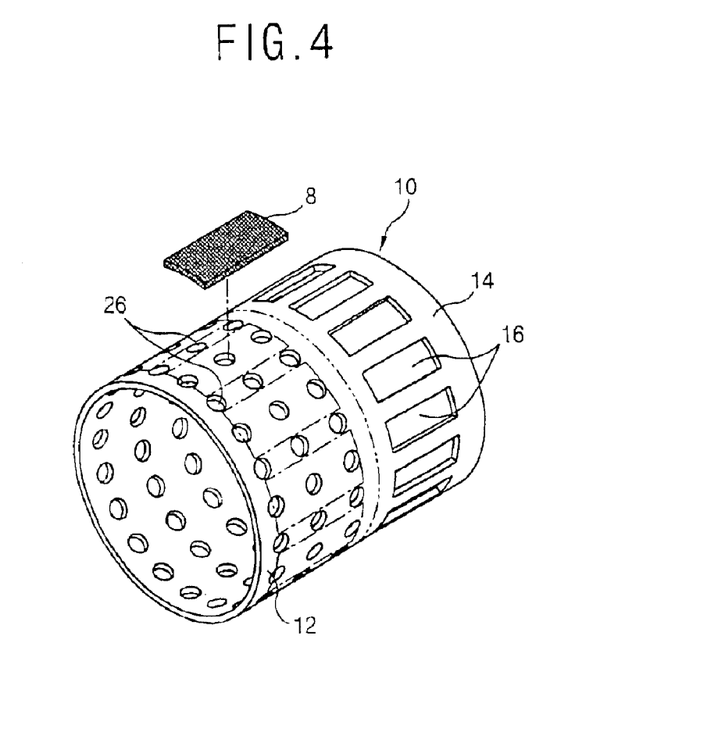
FIG. 4 is a perspective view showing a magnet frame of the reciprocating motor in accordance with the present invention.

As shown in FIG. 4, the magnet frame 10 is formed in a cylindrical shape having a predetermined thickness and positioned capable of linearly moving in an the air gap M between the outer stator 2 and inner stator 4. The magnet frame 10 includes a magnet mounting portion 12 in which the magnet 8 is mounted and a connecting portion 12 lengthened from the magnet mounting portion 12 connected to the operating unit. A plurality of air passes 16 are formed in the direction of circumference of the connecting portion 14.

In the magnet mounting portion 12 of the magnet frame 10, a plurality of magnets 10 are fixed at a uniform interval in the circumferential direction and an eddy current preventing hole 26 for attenuating eddy current loss caused by the magnet in driving the motor is formed.

Namely, the eddy current preventing hole 26 is formed to prevent lowering of motor efficiency by intercepting current loss which flows in the direction vertical to the longitudinal direction of the magnet frame 10 when the magnet frame 10 performs a linear reciprocating movement and the plurality of eddy current preventing holes 26 are protruded and formed in the magnet mounting portion 12 by the operations such as punching and the like.

The intervals among the eddy current preventing holes 26 and the adjacent eddy current preventing holes are formed to have a predetermined distance that a predetermined strength can be obtained for standing a load applied to the magnet frame by the inertia of the magnet.

The eddy current preventing holes 26 can be processed by the molding methods, such as drilling processing, die casting, and the like, instead of the punching operation. The predetermined number of eddy current preventing holes 26 can be lined up in the direction of the shaft of the magnet frame 10 and formed as circular through holes which are lined up at a uniform interval in the direction of circumference of the magnet frame 10.

Further in detail, the predetermined number of predetermined number of eddy current preventing holes 26 are formed in the direction of the shaft of the magnet frame 10 in the portion where the magnet 8 is fixed and it is desirable that the holes are formed in a structure that a predetermined number of the holes are formed among the magnets 8.

FIGS. 5 to 15 are front views showing the magnet frame under the condition that it is unfolded to illustrate various embodiments of the magnet frame of the reciprocating motor in accordance with the present invention.

The eddy current preventing hole can be formed in various shapes according to the shape, number or the way that it is arranged. Hereinafter, the various embodiments of the eddy current preventing holes will be described in detail.

Figure 5:
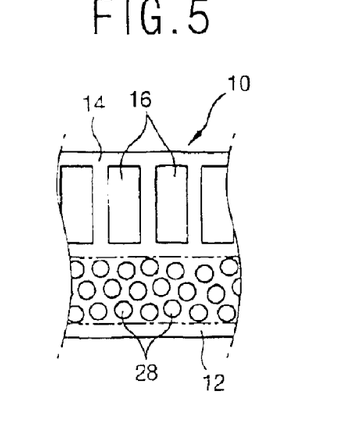
FIGS. 5 to 15 are front views showing the magnet frame under the condition that it is unfolded to illustrate various embodiments of the magnet frame of the reciprocating motor in accordance with the present invention.

As shown in FIG. 5, the eddy current preventing hole which is formed in the magnet frame in accordance with the second embodiment is formed as a circular through hole 28 having a predetermined diameter and positioned in a random shape.

Figure 6:
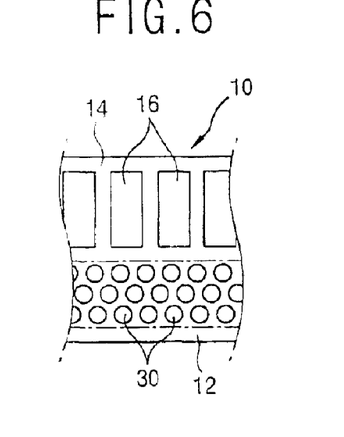
Figure 7:
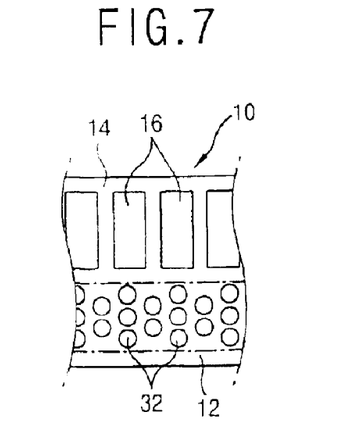

As shown in FIG. 6, as the eddy current preventing hole, a plurality of circular through holes 30 can be positioned to be a predetermined angle sloped in the direction of snaft of the magnet frame 10. As shown in FIG. 7, the number of the circular through holes 32 having a predetermined diameter can be changed according to the position where the through holes are formed in the direction of shaft of the magnet frame 10.

Figure 8:
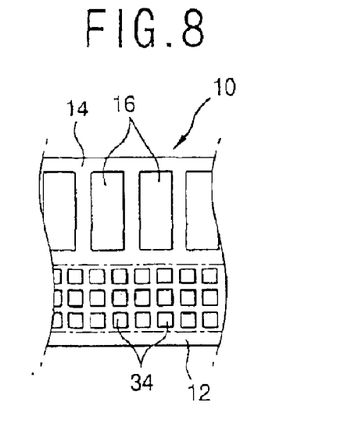

As shown in FIG. 8, the eddy current preventing hole which is formed in the magnet frame 10 in accordance with the third embodiment is formed in a shape of a square through hole 34 having a predetermined size and a predetermined number of the holes are formed in the directions of the shaft and circumference of the magnet frame 10.

Figure 9:
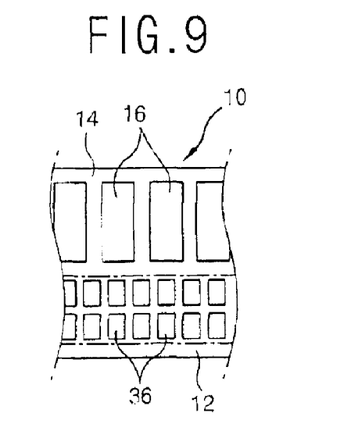
Figure 10:
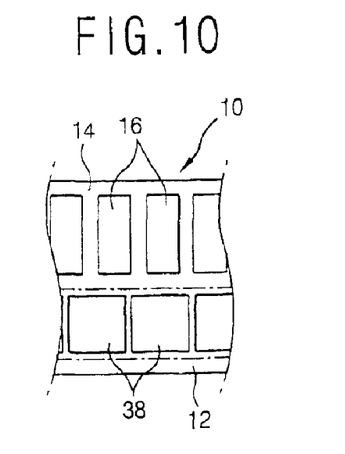

As shown in FIG. 9, the eddy current preventing hole in accordance with the third embodiment can be formed as square through holes 36 which are positioned in two rows in the direction of circumference of the magnet frame. As shown in FIG. 10, the eddy current preventing hole can be formed in the shape of square through holes 38 which are positioned in a row at a uniform interval in the direction of circumference of the magnet frame 10.

Figure 11:
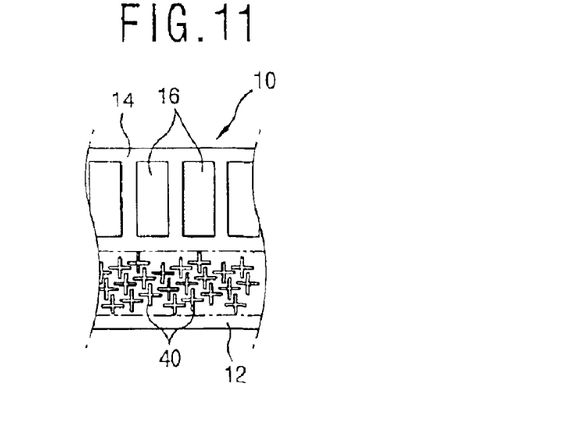

As shown in FIG. 11, the eddy current preventing hole in accordance with the fourth embodiment is protruded and formed in the magnet mounting portion 12 in the shape of a cross-shaped through hole 40.

Figure 12:
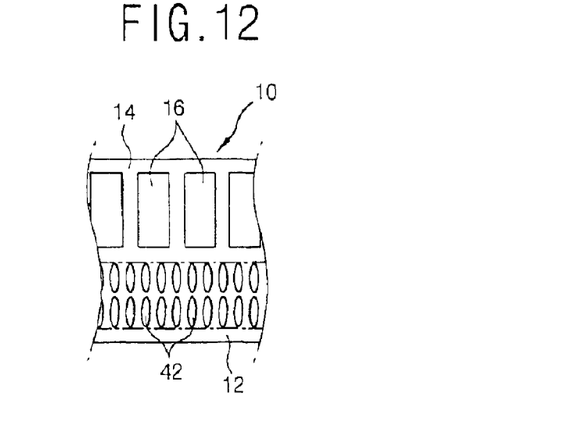

As shown in FIG. 12, the eddy current preventing hole in accordance with the fifth embodiment formed in the magnet frame 8 has a structure that it is protruded and formed in the magnet mounting portion 12 in the shape of oval through hole 42.

Figure 13:
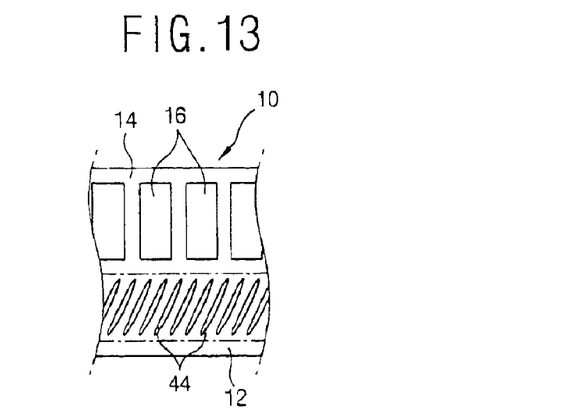

As shown in FIG. 13, the eddy current preventing hole in accordance with the sixth embodiment formed in the magnet frame 10 is formed in a shape that the oval through hole 44 is formed a predetermined angle sloped in the direction of shaft of the magnet frame 10.

Figure 14:
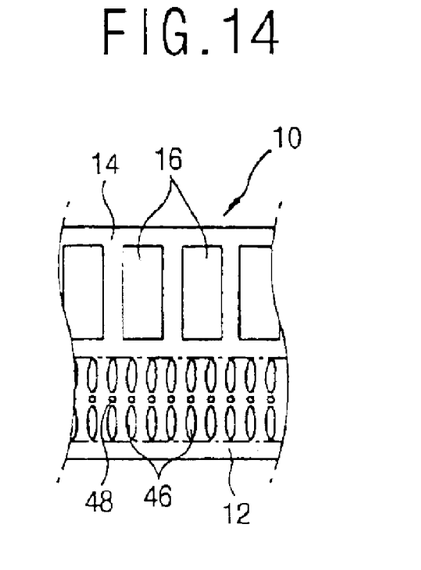

As shown in FIG. 14, the eddy current preventing hole in accordance with the seventh embodiment formed in the magnet frame 10 is formed in a structure that the oval through hole 46 and circular through hole 48 are mixed-shaped in the magnet mounting portion 12.

Figure 15:
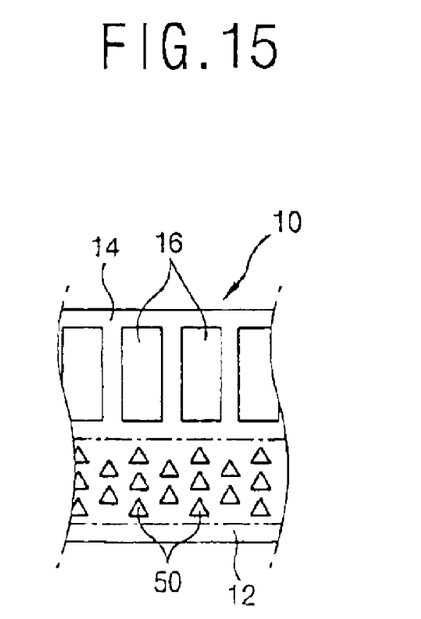

As shown in FIG. 15, the eddy current preventing hole in accordance with the eighth embodiment formed in the magnet frame 10 is formed in a shape of a polygonal through hole such as a triangle through hole 50 and the like and the hole can also be lined up at a uniform interval randomly.

In the above description, the eddy current preventing hole can be formed by mixing the shapes of the square through hole and oval through hole or by mixing the shaped of the square through hole and circular through hole and various shapes of through holes can be mixed-formed.

The operation of the reciprocating motor in accordance with the present invention with the above composition will be described as follows.

When a power is applied to the coil 6, a flux is formed around the coil 6 and the flux forms a closed loop along the outer stator 2 and inner stator 4. The magnet 8 linearly moves in the direction of shaft by the interaction between the flux formed between the outer stator 2 and inner stator 4 and the flux formed by the magnet 8.

When the direction of the current applied to the coil 6 is changed in turn, the direction of the flux of the coil 6 is changed and the magnet 8 performs a linear reciprocating movement. When the magnet frame in which a magnet 8 is fixed performs a linear reciprocating movement so that the operating unit such as a piston and the like performs a linear reciprocating movement.

Here, when the direction of the current applied to the coil 6 is changed in turn, an eddy current is generated in the direction of the circumference of the magnet frame 10 by the change of the flux which flows between the outer stator 2 and inner stator 4. The eddy current is intercepted by the eddy current preventing hole 26.

Namely, the eddy current which flows in the circumferential direction of the magnet is intercepted by the plurality of eddy current preventing holes 26 which are formed in the direction of circumference of the magnet frame 10, thus to minimize eddy current loss.

Here, the predetermined number of eddy current preventing holes 26 are lined up in the direction of shaft of the magnet frame 10 and formed in various shapes that the holes are lined up in the direction of shaft of the magnet frame 10, thus to intercept the eddy current and strengthen the magnet frame 10 whose thickness is formed thin to minimize the air gap M.

Also, since the eddy current preventing hole 26 is processed by the punching operation, high roundness of the magnet frame can be maintained as small amount of deformation stress is applied to the magnet frame in performing a punching processing.

As described above, in the reciprocating motor, a plurality of eddy current holes which are processed in the magnet mounting portion to attenuate eddy current loss generated in driving the motor, are formed respectively in the directions of shaft and circumference of the magnet frame in the magnet frame. Therefore, the eddy current which flows in the direction of circumference of the magnet frame can be intercepted, thus to minimize the eddy current loss.

Also, since the plurality of holes are formed in various shapes in the direction of shaft and circumference of the magnet frame, thus to reinforcing strength of the magnet frame and maintaining high roundness of the magnet frame.

Also, the magnet frame can be formed thin by reinforcing the magnet frame with the eddy current preventing hole, thus to minimize the air gap and minimize deformation and damage of the magnet frame by the reciprocating movement of the magnet.

At the present invention may be embodied in several forms without departing from the spirit or essential characteristics thereof, if should also be understood that the above-described embodiments are not limited by any of the details of the foregoing description, unless otherwise specified, but rather should be constructed broadly within us spirit and scope as defined in the appended claims, and therefore all changes and modifications that fall within the meets and bounds of the claims, or equivalence of such meets and bounds are therefore intended to be embraced by appended claims.

What is claimed is:

1. A reciprocating motor, comprising:
   an outer stator;
   an inner stator which is positioned having a predetermined air gap on an inner circumferential surface of the outer stator;
   a coil which is wound on either the outer stator or inner stator;
   a magnet which is positioned capable of performing linear movement between the outer stator and inner stator;
   a magnet mounting portion to which the magnet is fixed; and
   a magnet frame including a connecting portion which is connected with an operating portion for performing a reciprocating movement,
   eddy current protection holes formed in the magnet mounting portion for intercepting eddy current which flows in the direction of circumference of the magnet frame
   wherein the eddy current protection holes are arranged a predetermined angle sloped in the axial direction of the magnetic frame.

2. The motor of claim 1, wherein the eddy current protection hole is processed by a punching operation.

3. The motor of claim 1, wherein the eddy current protection hole is a circular through hole having a predetermined diameter.

4. The motor of claim 1, wherein the eddy current protection hole is a through hole formed in a polygonal shape.

5. The motor of claim 1, wherein the eddy current protection hole is a through hole formed in an oval shape.

6. The motor of claim 1, wherein the eddy current protection hole is a cross-shaped through hole.

7. The motor of a claim among claims 3 to 6, wherein the eddy current protection holes are lined up at a uniform interval in the directions of shaft and length of the magnet frame.

8. The motor of claim 1, wherein the eddy current protection hole is formed in a shape mixing a circular through hole and polygonal through hole.

9. The motor of claim 1, wherein the eddy current protection hole is formed in a shape mixing an oval through hole and polygonal through hole.

10. The motor of claim 1, wherein the eddy current protection hole is formed in a shape mixing a circular through hole and oval through hole.

11. The motor of claim 1, wherein the eddy current protection hole is shaped by a drilling processing.

* * * * *